(12) United States Patent
Judd

(10) Patent No.: US 6,763,312 B1
(45) Date of Patent: Jul. 13, 2004

(54) MULTIPLE DISCRIMINATE ANALYSIS AND DATA INTEGRATION OF VIBRATION IN ROTATION MACHINERY

(75) Inventor: John E Judd, Hamden, CT (US)

(73) Assignee: Dynamic Measurement Consultants, LLC, Cheshire, CT (US)

( * ) Notice: Subject to any disclaimer, the term of this patent is extended or adjusted under 35 U.S.C. 154(b) by 0 days.

(21) Appl. No.: 10/340,910

(22) Filed: Jan. 11, 2003

(51) Int. Cl.$^7$ .............................................. G06F 19/00
(52) U.S. Cl. ........................................ 702/56; 73/660
(58) Field of Search ........................ 702/56, 181, 102; 73/660, 593, 659, 504.13; 177/121, 75.13; 436/527; 266/44; 341/108; 705/415; 74/61

(56) References Cited

U.S. PATENT DOCUMENTS

| | | |
|---|---|---|
| 3,705,516 A | 12/1972 | Reis |
| 3,758,758 A | 9/1973 | Garnes et al. |
| 3,793,627 A | 2/1974 | Darrel et al. |
| 4,010,637 A | 3/1977 | Harwell et al. |
| 4,295,136 A | 10/1981 | Stoutenburg |
| 4,437,163 A | 3/1984 | Kurihara et al. |
| 4,478,082 A | 10/1984 | Sato et al. |
| 4,488,240 A | 12/1984 | Kapadia et al. |
| 4,493,042 A | 1/1985 | Shima et al. |
| 4,528,852 A * | 7/1985 | Sohoel ...................... 73/593 |
| 4,615,216 A | 10/1986 | Vykoupil |
| 4,729,239 A * | 3/1988 | Gordon ...................... 73/593 |
| 4,989,159 A | 1/1991 | Liszka et al. |
| 5,115,671 A | 5/1992 | Hicho |
| 5,266,929 A | 11/1993 | Carmichael et al. |
| 5,298,889 A | 3/1994 | Diei et al. |
| 5,319,357 A | 6/1994 | Diei et al. |
| 5,336,996 A | 8/1994 | Rusnak |
| 5,477,730 A | 12/1995 | Carter |
| 5,679,900 A | 10/1997 | Smulders |
| 5,744,722 A * | 4/1998 | Wu et al. ...................... 73/659 |
| 5,847,658 A | 12/1998 | Irie et al. |
| 6,145,381 A | 11/2000 | Mathisen et al. |
| 6,257,066 B1 * | 7/2001 | Chandler et al. ............. 73/660 |
| 6,370,957 B1 * | 4/2002 | Filippenko et al. ........... 73/660 |
| 6,484,109 B1 * | 11/2002 | Lofall ......................... 702/56 |
| 2003/0074159 A1 * | 4/2003 | Bechhoefer et al. ........ 702/181 |

* cited by examiner

*Primary Examiner*—John Barlow
*Assistant Examiner*—Xiuqin Sun
(74) *Attorney, Agent, or Firm*—DeLio & Peterson; Robert Curcio

(57) ABSTRACT

The Multiple Discriminant Analysis system described provides three parameters: (1) a Dynamic Force Factor (DFF) that characterizes the dynamic forces which act to reduce operational life of the bearing; (2) a Bearing Degradation Factor (BDF) that characterizes the actual condition of the rolling element bearing; and (3) a Life Expectancy Factor (LEF) that characterizes the overall condition of the first two factors. Each factor is configured in scalar form, wherein readings range from acceptable, to caution/degradation, to action required. DFF combines low frequency and high frequency dynamic forcing function discriminants. BDF combines, in this case, four powerful diagnostic bearing fault process discriminants, in a formulaic composition. The composition accurately describes the actual rolling element bearing condition indicating optimum or warning of a potential failure condition. The normally voluminous vibration data is compressed into three easily understood, yet highly informative numbers.

12 Claims, 8 Drawing Sheets

SETUP SCREEN

DATE: ▢ — 81

82 — POINT ID ▢ 000111

83 — FLEXIBLE ▢ 1.0

84 — RIGID ▢

RPM ▢ 3600

85 —

W6[%HFF] ▢ 0.2

86 —

W9[%DFF] ▢ .15

87 —

W10[%BDF] ▢ 1-W9

88 —

EXPECTED LIFE(hrs) ▢ 50000

89 —

TIME PERIOD (HRS) ▢ 8760

90 —

SAVE SETUP ▢

92 —

DISCRIMINANTS — 93

HFD  ON/OFF
CFD  ON/OFF
KFD  ON/OFF
EDD  ON/OFF

DISPLAY — 91

LEF       ON/OFF
DFF       ON/OFF
BDF       ON/OFF
PROB-FAIL ON/OFF
PROB-SURV ON/OFF
LEF       % / hrs ⇐ prev    nxt ⇒

MULTIPLE DISCRIMINATE ANALYSIS AND DATA INTEGRATION OF VIBRATION IN ROTATION MACHINERY

FIELD OF THE INVENTION

This invention relates to multiple discriminant analysis (MDA) and data integration of vibration in rotating machinery. As used herein "discriminant" is defined as "A linear set of variables that will classify events or items for which the variables are measured with the smallest possible amount of misclassification"—*Dictionary of Scientific and Technical Terms*, McGraw & Hill, Fifth Edition.

BACKGROUND OF THE INVENTION

Vibration analysis of rotating machinery to monitor life expectancy evolved following World War II, and has now been accepted as the most effective condition assessment and failure detection technique for rotating machinery. It is based on the principle that all rotating machines exhibit distinct operational and defect related vibration patterns that occur at rotational frequencies caused by forces, discontinuities, geometry placement and the physical condition of various machine elements. These vibration patterns change in energy and frequency content as the physical condition of the machine deteriorates. Measuring and interpreting the cause of the change enables those skilled in the art to detect problems early in the degradation process and initiate action to prevent machine failure, prevent production shutdown and potentially catastrophic failures. This technology has become the mainstay of modern predictive (PDM) and reliability centered maintenance (RCM) programs throughout the world. Various measurement techniques are hereinafter described, and the determinants derived are hereinafter described and discussed.

In spite of its technical effectiveness, the nature and complexity of vibration data and the process of extracting predictive failure data has added to the cost of its implementation and impeded its widespread commercial use. Highly skilled engineering level specialists, with extensive training, are often required for routine reviews and interpretations of data. The loss of one or two highly trained personnel can disrupt or cripple a major maintenance program.

Two of the most common techniques in general use for detection, measurement and analysis of vibrations in rotating machinery are Overall Measurement and Spectral Band Analysis. The overall measurement technique utilizes a piezoelectric crystal accelerometer to convert the mechanical vibration motion to a voltage proportional to the instantaneous acceleration mode vibration and monitors the root mean square (RMS) value of the broad frequency band displacement, acceleration or velocity signal. When the overall vibration level exceeds a predetermined threshold, a warning is initiated and inspection, repair, or machine shutdown action ensues.

This technique has the advantage of providing a single number, expressed in acceleration g units, in/sec velocity units or mil-inch displacement units, to indicate the machine condition. However, this technique has a weakness in that it often fails to detect subtle high frequency, low level bearing defects. High level energy from shaft imbalance and misalignment often dominates the overall signal causing it to be insensitive to low energy bearing problems. For this reason machinery bearing component failures often occur without warning, because this technique failed to provide adequate warning. The spectral band analysis technique, a more recent and improved technique employs a spectrum band analysis, where the vibration signal of defined bandwidth (upper and lower frequency content) is time sampled and converted into digital form. A Fast-Fourier Transform procedure is performed on the acquired data transforming it from the sampled time domain to the frequency domain in the form of frequency bands of varying amplitude. The level of each band indicates the frequency of the particular forcing function revealing its identity and its severity.

This format allows highly experienced maintenance personnel to directly observe the contributions of each problem source to the overall level at its own characteristic frequency. The individual frequencies, or spectral windows (placed around critical frequency bands) allow highly trained personnel to identify the source of a problem. For example, imbalance occurs at primary rotational frequency, misalignment at two or three times rotational frequency and the level of each component will identify the condition. Alarm levels are often preset for specific frequency bands. Levels above some predetermined levels indicate degradation. When the bands of interest include several selected narrow fast Fourier transfer bands, this technique is sometimes referred to as spectral windowing or enveloping.

This technique has the advantage of allowing the highly skilled maintenance practitioner (as used herein "practitioner" refers to a person experienced in rotating machine maintenance) to observe both high and low level signals at high and low frequencies to detect both imbalance and bearing signals. This spectrum analysis technique is very effective when used by an experienced maintenance practitioner, but not very effective in the hands of most untrained maintenance personnel. The spectrum analyzers and other analysis devices required are complex and require highly specialized training. The spectral data generated by such techniques is voluminous and cumbersome to store track and interpret. For these reasons, use of spectral analysis has been limited to the use of large organizations, able to maintain highly skilled maintenance teams trained in vibration analysis, or to contract with outside consulting firms.

The nature of the data produced in spectral analysis technique poses technical problems as well. The data ranges in frequency from a few Hz to 30 kHz and signal levels ranging from microvolts to volts. This data presents special problems in terms of analog or digital data transmission and storage. More importantly, the raw data generated is not easily understood and useful to management personnel.

Accordingly the present invention provides a new and improved multiple discriminant vibration detection, analysis and data integration system and method that reduces an entire highly sophisticated vibration analysis process to a few uniquely derived discrete numbers in a predetermined range. These numbers quickly convey the useful information required by a non-technical user, or a skilled practitioner, in order to judge the reliability, dynamic condition, the expected life and/or the degradation state of a machine bearing or group of machines bearings. The derived numbers may be displayed in a variety of ways, but generally in a fashion where a first twenty percent of the range would indicate a normal or acceptable level, the middle forty percent of the range would indicate cautionary alert and the other forty percent would indicate alarm/action.

The invention further provides a new and improved system and method for providing a signal indicative of and visual indication of the life expectancy of the bearing based on the dynamic forces exerted on the bearing. This is provided as a "stand alone" signal exclusive of the present bearing degradation condition.

An object of this invention is to provide a new, improved and simplified method and system for determining the vibratory condition of a rotating machine with rolling element bearings.

Another object of this invention is to provide a new, improved and simplified method and system that utilizes detected vibration of a machine to assess the conditions in a rotating machine, both as to the present state of bearing degradation and as due to the composite dynamic forces acting on bearings that lead to a shortened life expectancy.

Another object of this invention is to provide a multiple discriminant analysis method and apparatus that may be easily used by non-technical management and unskilled or moderately skilled personnel.

A further object of this invention is to provide a method and system that uses system operational discriminants combined in a unique fashion to accurately signify present bearing condition and life expectancy.

Still further objects of this invention are to derive and provide a single factor that provides an indication of machine condition, which provides a technically comprehensive indication of dynamic conditions that contribute to shortened machine bearing life, and that provides a technically comprehensive indication of actual bearing state of degradation and a failure probability estimate.

Prior to summarizing the invention, it will be useful to discuss the discriminants detected from a raw acceleration signal and utilized in practice of the invention and systems embodying the invention.

Discriminants Detected and Utilized in Practice of the Invention

Low Frequency Discriminant (LFD)

Imbalance, misalignment, belt resonance, warped shaft faults, and other such factors, that act to exert dynamic forces on the bearing element-race interfaces in a manner that reduces bearing life expectancy in rotating machinery, manifest themselves at frequencies at or near to the fundamental rotating frequency of the machine. For example: the dynamic force produced by a rotational imbalance is equal to the offset mass times the angular velocity squared divided by the radial offset.

$$\text{Force} = \text{mass} \times V^2 / r$$

Warped shafts, misaligned couplings contribute in the same fashion. All of these occur at frequencies close to the rotational frequency, and are the principal contributors to the dynamic force contribution. Most common industrial machines operate at rotational frequencies in the range below 7200 RPM (120 Hz). The LFD accepts the raw vibration signal, filters it to allow only inclusion of frequencies above 180 RPM (3 Hz]) and below 21,600 RPM (360 Hz), less than four times the 7200 RPM rotational speed. The upper corner frequency may vary for very low speed or very high-speed machines but should be roughly less then four times the shaft rotational frequency. For lower or higher speed machines the filter upper corner may be conveniently shifted up or down by means of a motor speed selection button. A low frequency filter allows these signals to pass and then converts the signal to a normalized RMS (root mean square) DC voltage such that normal vibration, on a scale of one to ten, is in the range of 1 to 2 volts, moderately excessive in the range of 2 to 6 volts and dangerously excessive is in the range of 6 to 10 volts. When this voltage is excessive it alerts the practitioner to a condition that will eventually reduce the expected life of the bearing. It also is clearly related to low frequency balance, alignment, belt resonance, eccentric shaft, or other such problem that can be determined by a skilled practitioner, all of which are referred to as 'Dynamic' forces. In accordance with one aspect of the invention the LFD is modified to provide a composite stand alone signal indicative of a Dynamic Force Factor (DFF) representative of the dynamic forces on the bearing In accordance with the invention the next four discriminants are included in a formulaic approach to develop a Bearing Degradation Factor (BDF) as hereinafter explained.

High Frequency Discriminant (HFD)

When a rolling element bearing begins to degrade the bearing surfaces begin to develop microscopic surface defects. As the balls pass over the surface, they begin to generate highly scattered, high frequency impact energy, with periodicity roughly related to mathematical ball and race geometry, but with many generally unpredictable frequency components. Experience indicates that the bulk of the energy is contained in the high frequency region between 200 Hz and 10 kHz, and follows a somewhat predictable pattern during the failure process.

The HFD aggregates this high frequency data in the range of approximately four times the primary rotational frequency up to 10,000 Hz. In accordance with the invention the RMS value of the energy is converted to a DC voltage. The DC value of this voltage is generally proportional to energy of the vibration levels caused by rolling element bearing ball defects, inner and outer race defects, along with element rubs, and cage resonance. As an additional feature the raw input signal, prior to filtering, may be made available for more detailed spectral analysis by the practitioner.

Crest Factor Discriminant CFD)

Another and equally useful diagnostic technique for detecting early stages of bearing failure is called Crest Factor (CF) analysis. As part of the process of rolling element bearing deterioration, microscopic cracks develop on the rolling surface of the bearing, or the race. As the bearing rotates, these cracks contact the smooth opposing surfaces of the bearing and race. When the surfaces impact they generate very high amplitude, short duration, acceleration spikes, sometimes referred to as Dirac function spikes. Crest factor is the ratio of the time domain peak value of these transient impact accelerations to the overall RMS value of the selected vibration signal band. If the bearings were new, and the surfaces perfectly smooth, the vibration would be near sinusoidal and the crest factor would approach a sinusoidal value of peak to RMS ratio of 1.414. When defects develop, the Dirac peaks begin to increase in magnitude, but because they are of short duration they contribute very little energy to the RMS value, and the ratio of peak to RMS begins to increase. The CF value will rise, reaching values of four to seven or more. As the failure process continues the surface discontinuities will begin to wear, and the CF value will begin to decrease just prior to failure. Trending this CF value is a very good indicator of bearing condition and impending bearing failure, but requires specialized equipment and a highly skilled practitioner for effective implementation. The invention utilizes a DC value derived from the value of Crest Factor referred to as CFD.

$$CF \text{ is proportional to the expression } p_i = (x_i - \ddot{u})/\ddot{u} \qquad (1)$$

Where: $p_i$=crest factor,
$x_i$=Instantaneous sampled value, and
$\ddot{u}$=RMS value of sampled waveform.

Typical variations in this variable ratio experienced in practice range from 1.5 to 7.0. In the practice of the invention a DC voltage is derived and scaled to provide the CFD.

Kurtosis Factor Discriminant (KFD)

The Kurtosis factor is a statistical measure of time waveforms peakedness. It is similar to Crest Factor in that it is also a ratio, but Kurtosis is the fourth moment of the peak to RMS ratio, and is therefore much more sensitive to changes in the peak value. It is often used as a very effective bearing defect diagnostic tool. In the invention a modified Kurtosis value KFD is derived from the sampled peak and the overall RMS value. Since it represents the fourth moment, the KFD discriminant is nonlinear, and is slightly more sensitive to early stages of bearing surface degradation than CFD. This is especially valuable when early detection of incipient bearing failure is critical. A typical example would be a cooling pump in a nuclear power plant.

$$KFD \text{ is proportional to } m4 = \Sigma(xi-\ddot{u})4/n \text{ between } i=0 \text{ and } i=n \quad (2)$$

Where n is the number of samples, and

Where: $m_4$=the mean Kurtosis value,
$x_i$=instantaneous value of signal,
n=the number of samples, and
ü=the mean value of 4th moment of samples.

A DC signal proportional to the value of the Kurtosis Factor is derived. In practice of the invention this DC signal is scaled to provide the discriminant KFD.

Envelope Demodulation Discriminant (EDD)

Another very useful detection and diagnostic technique, frequency envelope detection and demodulation, is widely used to detect early stages of bearing degradation. This technique also uses the high energy Dirac impulse phenomena described in the Crest Factor description, to extract still another form of defect information from the acceleration signal. The high energy Dirac spikes cause energy to be propagated throughout the frequency spectrum and initiate excitation of the vibration sensor crystal resonant frequency. This crystal frequency, often above 20/30 kHz, acts as a carrier. This carrier is modulated by the low frequency bearing ball spin and inner/outer race impacts. By band passing energy centered around the resonant frequency, detecting it and passing it through a low pass demodulation filter the low frequency envelope of the signal that contains information on the classic rolling element bearing defect frequencies, may be extracted. This band is again rectified and converted to a DC voltage proportional to the RMS magnitude of the demodulated defect energy. In addition, the real time, demodulated signal is made available and may be analyzed by the practitioner, to provide detailed spectral information on the nature of the defect if required. The demodulation information may be obtained by other means, for example by Hilbert transform techniques. See *Shock and Vibration Handbook*, by Cyril M. Harris, 3rd Edition, pages 13–45.

In accordance with the invention these discriminants provide the data for deriving three important factors, a Dynamic Force Factor (DFF), A Bearing Degradation Factor (BDF) and A Life Expectancy Factor (LEF).

SUMMARY OF THE INVENTION

Briefly stated, the invention, in one form thereof, provides a system for determining the various discriminants outlined above and combining signals representative of some of the discriminants in a simplified manner to determine the life expectancy, or remaining life of a rotating machine bearing, or the requirements for maintenance to extend and optimize the useful life of the machine, or to estimate the probability of machine bearing failure for some specified future operating period.

The vibrations of a rotating machine are detected by a piezoelectric accelerometer and applied to a plurality of channels where the discriminants identified above are determined. Four diagnostic routines or techniques, each designed to detect early degradation in rolling bearing elements, are performed on the detected acceleration signal to determine discriminants. The discriminants are converted to a voltage signal within a predetermined range as a measure of the particular factor.

The discriminants HFD, CFD, KFD and EDD are combined to display a value that signifies the condition of the machine bearings. The combining of the four discriminants stated above may be done by either an addition or a multiplication process and provides a Bearing Degradation Factor (BDF). The BDF is indicative of the instantaneous condition of the bearing.

A low frequency discriminant, LFD, as heretofore described is derived from the accelerometer signal that is indicative of the dynamic forces on the bearing. The LFD is essentially a dynamic force factor (DFF). This DFF signal may be weighted with other factors.

The BDF and DFF are combined in a weighted relationship to provide a life expectancy factor signal, LEF, which indicates the present condition of the bearing weighted by the dynamic loads thereon to give a composite indication of present bearing condition plus the effect of the dynamic loading of the bearing on its expected life and probability of failure.

The invention simplifies machine condition assessment and greatly improves the probability of accurate decision making on life extension, and bearing replacement by maintenance personnel.

The features of the invention that are believed to be novel are particularly pointed out and distinctly claimed in the concluding portion of this specification. The invention, however, together with further objects and advantages thereof may best be appreciated by reference to the following descriptions taken in conjunction with the drawings.

BRIEF DESCRIPTION OF DRAWINGS

FIGS. 5a–5e are front views of a hand held controller and visual display that may be utilized in the practice of the invention; and FIG. 6 is a block diagram of a memory unit within the processor shown in FIGS. 5a–5e.

DETAILED DESCRIPTION OF PREFERRED EMBODIMENTS

Figure 1:
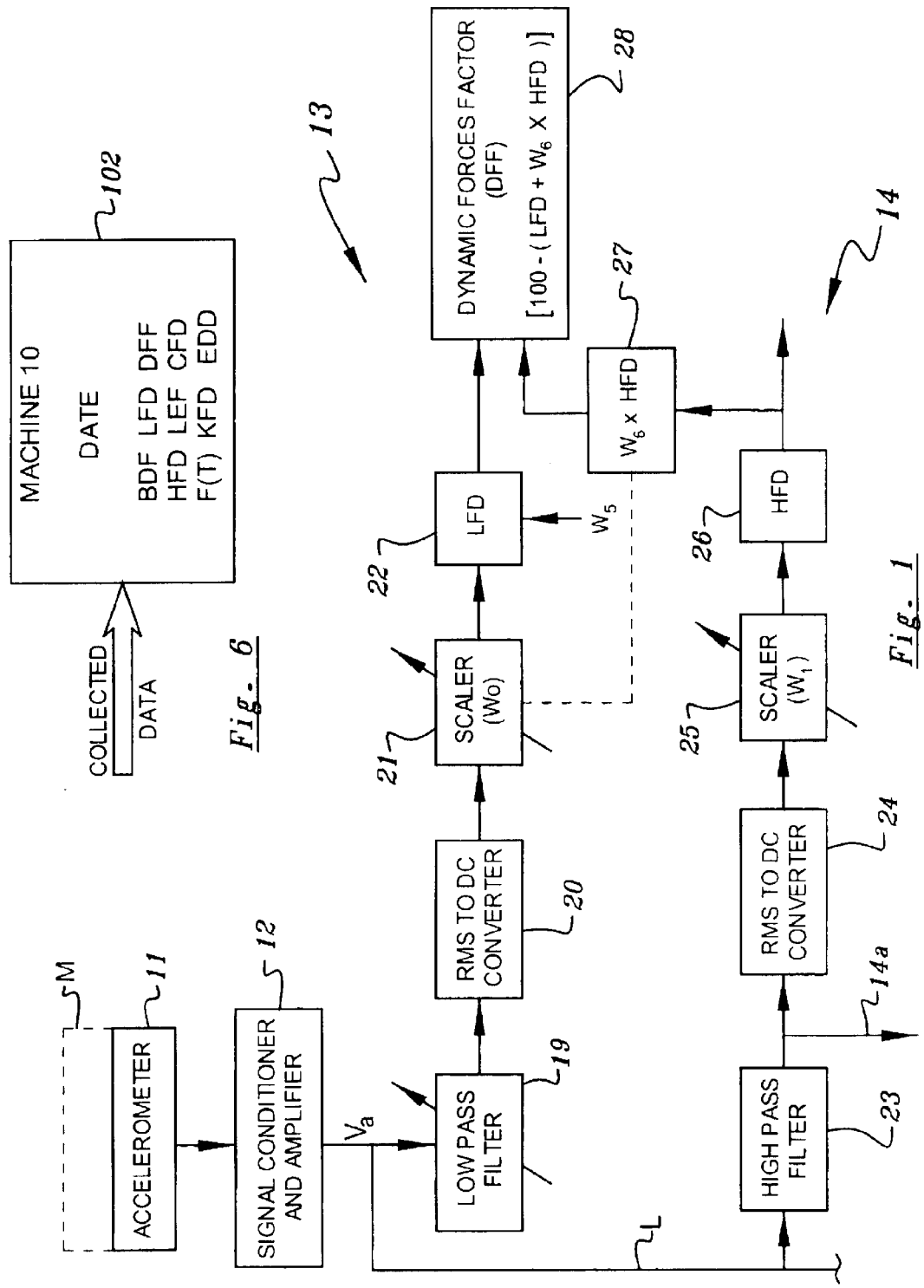
FIG. 1 is a schematic diagram in block form of portion of a system embodying the invention.

In accordance with the invention the above described discriminants provide the basic data for deriving three important factors, Life Expectancy Factor (LEF), Bearing Degradation Factor (BDF) and Dynamic Force Factor (DFF).

The Life Expectancy Factor (LEF) is a measure of those dynamic factors that act to reduce the optimum life expectancy of the machine rolling element bearings.

The DFF is essentially the LFD that includes the principle factors that create the dynamic rotational forces on the bearing/shaft interface, such as shaft imbalance, coupling misalignment, shaft warp, a portion of the high frequency cyclic energy, and other such conditions. A simplified bearing life equation as used by Torrington Bearing Company of Torrington, Conn. is hereinafter set forth, and also *Shock and Vibration Handbook*, 3$^{rd}$ Edition, by Cyril M. Harris, McGraw-Hill, 1988, Section 11, Page 16, show that the expected life of a properly lubricated bearing will decrease exponentially with increased dynamic load. It follows logically that as the dynamic forces increase, the life expectancy will be affected negatively. By capturing the composite acceleration contributions of all these dynamic bearing forces, a factor that relates directly to reduced life expectancy in the bearing can be derived. If the forces are minimized, that is, if the machine is well balanced and aligned, the dynamic forces will be reduced and hence life expectancy will be improved. LEF, in one form, is a derived DC value that reflects this condition. A low or declining value is a clear indication to the practitioner that the life expectancy of the machine will be reduced and action should be taken to determine if, rebalancing, alignment, or other action is required to restore optimum conditions.

In accordance with the invention an additional weighting factor is added to the final LFD discriminant. This factor allows for differences in measured vibration levels due to changes in the effective mass of the operating machine. Since the DFF derived in accordance with the invention relates to dynamic forces rather than measured vibration levels, it is important that allowances be made for differences in level caused when machines are bolted to rigid supporting bases. In these cases vibratory levels are reduced since the generated dynamic force remains constant for a given operating condition, and force is equal to mass times acceleration (F=MA), the normal measured acceleration level will drop as effective mass is increased between flexibly mounted and solidly mounted machines. While the measured levels may drop the stresses on the bearing may actually increase, so the DFF must be adjusted. A default weighting factor that may be user modified is provided to account for this effect. A user may adjust this factor by selecting an expected optimum value available from a variety of reference sources or his/her own experience. The change in measured DFF will be proportional to the change in dynamic forces occurring in the bearing in any case, but the alert and action levels indicated will be adjusted by this factor.

The dynamic forces on a bearing produced by the rotating element will increase as the square of the rotational frequency. Static and dynamic loading will vary accordingly and stresses on the bearing contact surfaces can reach 200,000 to 500,000 psi.—*Rolling Bearing Analysis*, 3$^{rd}$ Edition, Tedrick Harris, Wyle. This will be accounted for in the DFF because the force will produce an increase in measured acceleration and hence an increase in DFF, signaling increased bearing loads and decreased life expectancy.

Another consideration in determining the DFF is dynamic loading due to Hertzian stress, which is related to components of the high frequency energy due to bearing and race anomalies and other impacts—*Rolling Bearing Analysis*, 3$^{rd}$ Edition, Tedrick Harris, Wyle. In accordance with the invention, a portion of this energy in the HFD is considered in determination of DFF.

Bearing manufacturers publish the life expectancy ($L_{10}$) of their bearings for stated loads and speeds. The Torrington Bearing Company of Torrington, Conn. gives the following simplified general bearing life equations for estimating expected bearing fatigue life:

$$L10=[16667 \times a/N[f_bC/P]10/3 \text{ Hours} \quad (3)$$

Where:

$L_{10}$=Equals expected life for 90% of a given group of bearings under a given set of conditions.

N=Shaft rotational speed in RPM

C=Factory Load Rating of bearing in Pounds or Newtons.

P=Equivalent radial load on bearing in Pounds or Newtons.

$f_b$=Life adjustment factor for number of bearings adjacently mounted.

a=Composite life adjustment factor for application conditions, normally equal to one or less. Obtained by referring to manufacturers chart on the ratio of actual lubricant viscosity to reference viscosity, bearing material and statistical percentile for life expectancy for specific bearing pitch diameter and running speed.

While this equation is a useful guide for estimating expected life, it is recommended that the bearing manufacturer be consulted for advice on specific operating conditions.

This equation is set forth primarily to show that the life expectancy of a bearing varies inversely with rotational speed and exponentially with load. It is worth noting that the choice of a reference is very important when used to estimate remaining life expectancy. The use of the manufacturer's estimate of expected life based on 90$^{th}$ percentile, or a failure probability estimate of 10%. Use of this life expectancy in the Weibull probability of failure calculation will yield a very conservative estimate. For estimates, failure probabilities of 50% ($L_{50}$) have been found useful by experienced practitioners.—*Rolling Bearing Analysis*, 3$^{rd}$ Edition, Tedrick Harris, Wyle. When used in the Weibull calculation this yields a Mean Time To Failure (MTTF) of approximately five times the manufacturers $L_{10}$ estimate for initial expected life. The user must decide on the appropriate figure to use for the MDA optimum starting life estimate.

The Bearing Degradation Factor (BDF) is a derived factor that directly indicates the operating condition of the bearing. It accomplishes this through application and summation of multiple discriminants that include weighted combinations of the four most effective known analysis techniques. When a bearing is in like new condition the BDF reads close to 100%, in a preferred technique of LEF indication. As the bearing begins to degrade, the reading drops below 80%, through a cautionary warning state and finally below 40% the user is warned to replace the bearing. Experience has shown that all of the discriminant techniques are individually effective, but not infallible, as hereinafter exemplified. This multiple discriminant technique dramatically increases the reliability of the defect call process in a much simpler and more understandable process.

A weighting process is utilized to accommodate the relative signal level contribution of each of the discriminants. For example: the initial signal levels produced by the envelope demodulation process are far lower than those produced by the HFD process, the CFD produces a ratio ranging from one and one half to seven (1.5 to 7.0) and KFD produces numbers that may exceed forty (40). Each of these requires adjustment so as to provide approximately evenly weighted contributions to the final BDF.

It has also been found that the discriminants can be combined as either a sum or a product of the discriminant values. Test experience showed the product approach to be more sensitive to early bearing defects but exhibited somewhat larger overall variations in values for given fault ranges. The sum approach produced a more uniform approach with a narrower variation in output value. The summed value approach was used for most of the final testing.

The Life Expectancy Factor (LEF) is a weighted combination of the DFF and the BDF that provides a general machinery condition indicator. The LEF includes contributions of both previous factors and provides a warning to the practitioner if either DFF or BDF is declining. The LEF may be displayed as a zero to 100% condition or roughly correlated to expected remaining bearing life, where 100% corresponds to bearing manufacturer's, or the user's, published optimum bearing life in hours, days, operating cycles, or other time related units.

The expected life is initially the specified bearing life of the bearing manufacturer. However, with time of operation of the bearing, the life may decrease with the dynamic loads exerted on the bearing and bearing degradation may set in. The LEF determined by the invention can be configured to express the present expected life as a percentage of the bearing manufacturer's stated life expectancy or in estimated remaining hours.

A system 10 for practicing the invention is illustrated in schematic and functional block form in FIG. 1. The system as described in FIG. 1 is an analog system in which the various discriminants are expressed as analog voltage values. These voltage values are signified by displays in Arabic numerals within specified ranges or as percentages. The invention includes implementing all of the functions disclosed in all of the Figures using all digital technology or at any point converting from analog to digital. As used herein the term "signal" refers to the magnitude of a signal whether expressed by an analog voltage level or in digital form.

A vibration sensing accelerometer 11 is mounted to a rotating machine M or otherwise stated to a machine M having a bearing supported rotating element. The accelerometer typically is sensitive to vibrations in the range of three Hz to twenty-five kHz, and has a sensitivity of 100 mv/g, with a known natural frequency range of 25 kHz to 35 kHz. For special cases of extremely low or high-speed machines the sensor parameters may vary, but the principles of the invention still apply.

Figure 2:
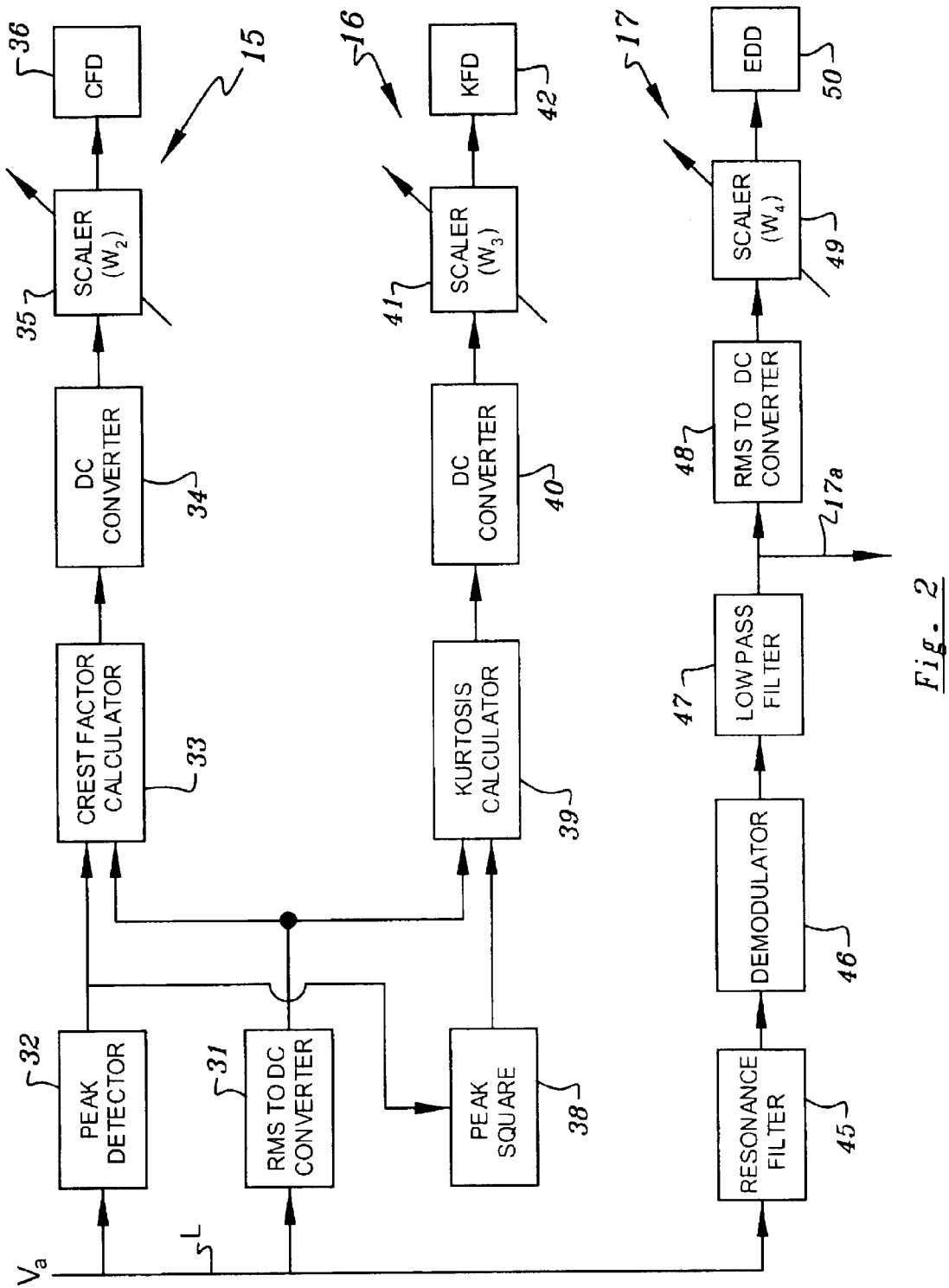
FIG. 2 is a schematic diagram in block form of an extension of FIG. 1.

The unfiltered output of accelerometer 11 is applied to a signal conditioning amplifier 12 that supplies a good quality signal $V_a$ proportional to vibration acceleration. The signal $V_a$ is applied to detection channels 13 and 14, shown in FIG. 1 and detection channels 15–17 as shown in FIG. 2 over a line L.

Channel 13 includes a low frequency filter 19 that passes only those frequencies below approximately three to four times the machine rotational speed down to about three Hz. These are the frequencies associated with machine balance, alignment or shaft eccentricities, and foundation problems as well as externally induced loads, i.e. dynamic forces on the bearing. The frequency pass range of low frequency filter 19 is adjustable in view of the rotational speed of the machine under inspection. The filter 19 passes the frequency components that are the principal detriments to bearing life expectancy by virtue of the dynamic forces on the bearing structure. The preponderance of these frequency components is assumed to be in a frequency range of approximately one twentieth to four times the rotational frequency of the shaft of the machine.

The output of low pass filter 19 is applied to a RMS to DC converter 20, which provides a direct current signal, proportional to the aggregate signal, to an adjustable scaler 21 that provides a predetermined weight, $W_0$, to the DC signal from converter 20 and provides the LFD which is stored in a memory 22. The LFD is also effectively the DFF, which is again utilized as hereinafter described. The LFD may also be displayed at memory 22. The LFD signal is modified by a factor $W_5$, at memory 22, which accounts for machine mounting. The factor $W_5$ is determined by whether the machine is rigidly or flexibly mounted. The modified LFD signal is utilized in conjunction with a portion of the HFD to derive DFF.

The rotational speed of the machine under inspection is a factor in determining LFD. As will hereinafter be pointed out, the upper band pass frequency is variable in a programmable hand held processor, where the rotational speed of the machine is entered and sets the upper pass frequency of filter 19 as a function of that rotational speed.

Channel 14 includes a high frequency filter 23, which, for most machines, passes frequencies from four times rotational speed up to ten kHz, but may vary slightly for special applications. The preponderance of bearing defect energy is contained in this frequency range. The magnitude of the signal energy in this frequency range increases measurably as bearing defects develop. The output of filter 23 is applied to a RMS to DC signal converter 24. The output of converter 24 is applied to an adjustable scaler 25 that provides a predetermined weight, $W_1$, to the DC signal from converter 24 and provides the HFD to a memory 26.

In accordance with the invention, a percentage, $W_6$, of the HFD signal, is added to the LFD to derive DFF. A scaling or multiplying unit 27 samples the HFD signal and applies the result to a unit 28 that calculates DFF by the following equation:

$$DFF=[100-(LFD+W_6\times HFD)] \quad (4)$$

The DFF display indicates, in a simple manner, that the machine operating condition is such that the optimum bearing life may, or may not be realized. If not, maintenance attention in the form of inspection of drive belts, foundation, balancing, eccentric loads, or alignment may be required and any necessary correction made. The value of the DFF is weighted and combined with the BDF, as hereinafter explained to provide the formulaic LEF.

Figure 3:
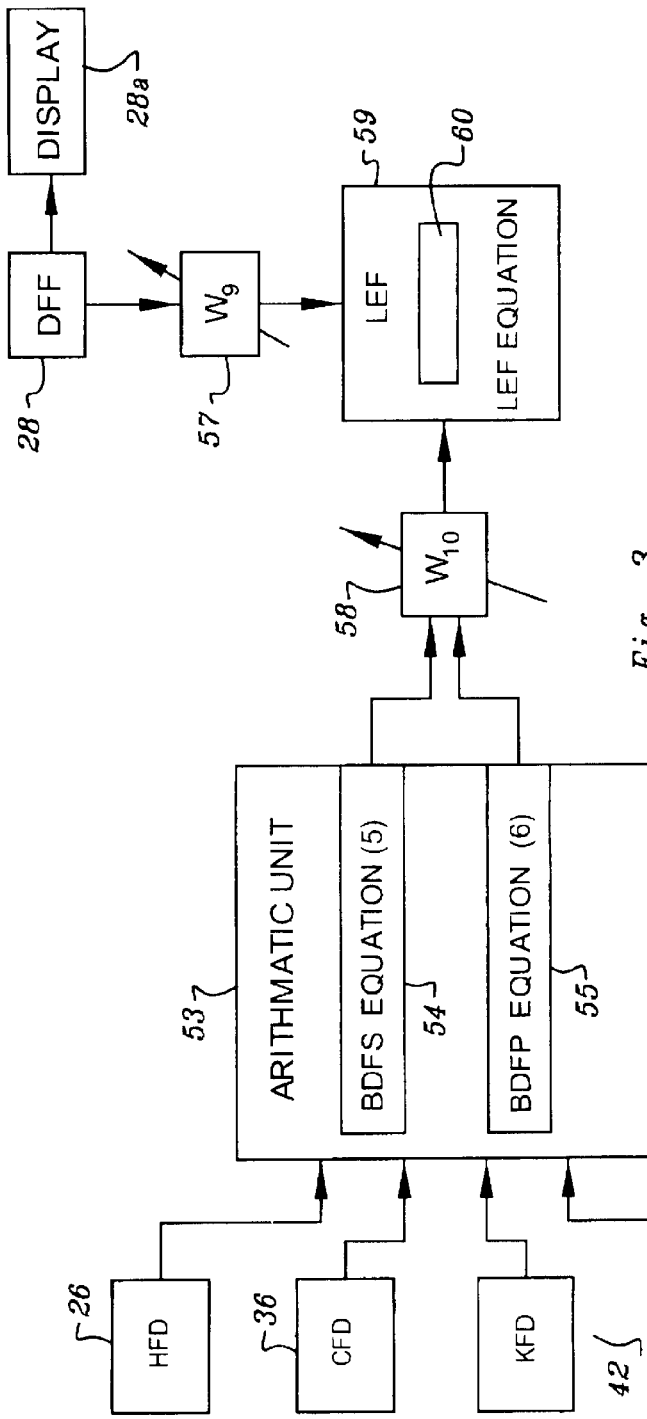
FIG. 3 is a schematic diagram in block form of a further extension of the system of FIG. 1.

Referring to FIG. 3, a DC converter 34 is utilized in both channels 15 and 16. Channel 15 includes a peak detector 32 that captures and stores the highest instantaneous peak value of the raw, real time acceleration signal, $V_a$, from signal conditioning amplifier 12. A Crest Factor calculator 33 calculates and stores a signal indicative of the Crest Factor ratio determined in Crest Factor calculator 33. The output of peak detector 32 is divided by the RMS value of the signal $V_a$ in Crest Value calculator 33 and applied to a DC converter 34 that applies a DC voltage indicative of the Crest Factor to an adjustable scaler 35. Scaler 35 provides a predetermined weight, $W_2$, to the DC signal from converter 34 input and provides the CFD to a memory 36.

Channel 16 includes a peak square calculator 38 that receives an input from peak detector 32 calculates the square of the peak value of the acceleration signal $V_a$. This squared peak value is applied to a Kurtosis calculator 39 together with the RMS signal from RMS converter 40. The Kurtosis Factor is also a ratio and this signal is applied to a DC converter 40. The DC output of converter 40 is applied to an adjustable scaler 41 that provides a predetermined weight, $W_4$, to the DC signal input and provides the KFD signal to a memory 42.

Channel 17 includes a filter 45 tuned to the resonant frequency of the accelerometer. Filter 45 eliminates frequencies other than the natural frequency of the accelerometer (typically 20–30 kHz) and supplies this signal to a demodulator 46. The output of demodulator 46, which contains all of the low frequency bearing defect related information, is applied to a low pass filter 47, and then a RMS to DC converter 48, and then an adjustable scaler 49, which provides a predetermined weight, $W_5$, to the rectified signal and provides the EDD to a memory 50.

The accelerometer resonance signal is a carrier for the machine bearing impact frequencies. These impacts occur at lower frequencies and are roughly related to inner and outer race and ball spin equations shown in *Shock and Vibration Handbook*, by Cyril M. Harris, $3^{rd}$ Edition, McGraw-Hill, 1988, Section 16, Pages 10–11, which are incorporated herein by reference.

The RMS or Ratio to DC converters 20, 24, 34, 40 and 48 are known devices that output DC signals proportional to a desired discriminant before weighting. The scalers 21, 25, 35, 41 and 49 introduce a gain or weighting factor to the signals from the converters. The units identified as memories may be of any type of circuit that will store a signal representative of a derived value.

The presentation of the information relative to bearing degradation, BDF, dynamic forces, DFF, and life expectancy, LEF, may be accomplished in several ways. A preferred technique is to express both BDF and DFF on a 0 to 100% basis, where 90 to 100% would be a new well-installed and lubricated bearing in the case of BDF. In the case of DFF, 90 to 100% would be optimum mounting, alignment and balance of machine, whose bearings are under test, to minimize to within acceptable standards all dynamic forces on the bearing.

The scalers 21, 25, 35, 41 and 49 are all indexed for a gain to give an output (ten volts as exemplified) of the worst possible bearing condition, i.e. 100%, for each discriminant. The output of the DC converters are as shown below in Table I for an accelerometer having a sensitivity of 100 millivolts/g:

TABLE I

| DC OUTPUT (Millivolts) | SCALER (coefficient) | DISCRIMINANT (Volts-worst case) |
|---|---|---|
| RMS-DC Converter 20 | 200 | $W_0$ = 50, LFD = 10 volts = 100% |
| RMS-DC Converter 24 | 500 | $W_1$ = 20, HFD = 10 volts = 100% |
| DC Converter 34 (ratio) | 7 | $W_2$ = 1.414, CFD = 10 volts = 100% |
| DC Converter 40 (ratio) | 50 | $W_3$ = 0.2, KFD = 10 volts = 100% |
| RMS-DC Converter 48 | 167 | $W_4$ = 50, EDD = 10 volts = 100% |

As shown in FIG. 3, the discriminants HFD, CFD, KFD and EDD, stored in memories 26, 36, 42 and 50, are applied to an arithmetical unit 53, which may be an adder or multiplier to provide BDF Sum (=BDFS) as shown in equation (5) or BDF Product (=BDFP) as shown in equation (6).

For BDFS, the sum of the four discriminants are modified by a factor, $W_7$, equal to ten times the reciprocal of the number n of discriminants summed (2.5 as shown) in unit 53 or multiplied or by a factor $W_8$, which is 1/10n if the discriminants are multiplied as shown in equation (6), where n is the number of discriminants. The mounting factor $W_5$ is a factor in both of equations (5) and (6). The result, in either mode of calculation in unit 53, is applied to a display 54 and/or 55. These discriminants are combined as shown by either or both of equations (5) and (6) indexed to provide a zero to 100% display.

$$BDF(\text{Sum})=100-[W1\times HFD+W2\times CFD+W3\times KFD+W4\times EDD][W5\times W7] \quad (5)$$

$$BDF(\text{Product})=100-[(W1\times HFD)(W2\times CFD)(W3\times KFD)(W4\times EDD)][W5\times W8] \quad (6)$$

Where $W_1$–$W_4$ are the weights assigned to voltage outputs of the converters by the scalers 21, 25, 35, 41 and 49 as shown in Table I. $W_5$ is the mounting coefficient. The mounting coefficient $W_5$ has a range of 1.5 to 1.7 in increments of 0.1. If the machine mounting is rigid, $W_5$=1.5 TO 1.7 (default 1.6). The International Standards Organization states in ISO 10816-3:1998 that "The general effect on measured vibration levels for rigid vs. flexible supports for small to large size machines, pumps with multi-vane impellers, ranges from 0.6 to 0.64. That is measured vibration level for a given rigidly mounted machine may increase by a factor of 1.56 to 1.67 flexibly mounted."

Both resulting BDF factors (sum and product) are scaled to BDF=100% for convenience in indexing 100-BDF from zero to 100 as shown in equations (5) and (6).

In Table I, the coefficient $W_0$ is shown at a value (50) that occurs when $W_6$ is zero. Scalers 27 and 21 are inversely related as shown by the broken line 27a. Since it is chosen to have an output of ten volts at LFD for the worst case condition, the scaling coefficient $W_0$ is decreased as $W_6$ increases in accordance with the relation $W_0=50-50(W_6)$. Thus, for a default value of 0.2 for $W_6$, $W_0$ will be forty (40).

The bearing degradation factor as determined by equations (5) and (6) may be signified in several ways to indicate the condition of a bearing. It is preferred to provide an indication on a scale of 0–100%, where 80 to 100% indicates an optimum condition, 40 to 80% indicates a maintenance alert, 0 to 40% indicates probable failure is imminent and maintenance correction required.

Determination of and combining of the weighted discriminants to determine BDF provides a new and more accurate analysis of bearing condition with a significantly reduced probability of missing a call on a defective bearing.

In tests on thirty bearings known to have "moderate" (lightly scored) damage to the rolling elements or the inner or outer race, the following results were produced using each discriminant independently, and the BDF(sum) composite degradation factor to detect the fault.

HFD Eighty three percent (83%) showed abnormal readings

CFD Seventy eight percent (78%) showed abnormal ratio readings

KFD Seventy eight percent (78%) showed abnormal ratio readings

EDD Eighty three percent (83%) showed abnormal readings

In these tests, the probability of catching a fault, based on a single discriminant, varied from 0.78 to 0.83. Therefore the probability of missing a call on a moderately scored bearing, using only one discriminant, varies from seventeen to twenty two percent.

Using the multiple discriminant approach of the present invention BDF, and four discriminants, the mathematical probability of missing a call on a moderately scored bearing decreases to [0.17×0.22×0.22×0.17=0.0014] or 0.14%.

Assuming that only three discriminants (HFD, CFD and EDD) were utilized in determining BDF, the probability of missing a call is [0.17×0.22×0.17=0.00662] or 0.66%. This is still a significant improvement.

The test demonstrates that the probability of detecting a moderately damaged bearing has been improved significantly with the multiple discriminant approach without complex equipment, or need for a skilled practitioner.

Reference is made again to FIG. 3, which also illustrates the derivation of LEF from DFF and BDF. The DFF in memory 28, which is shown in a display 28a, is assigned a weight, $W_9$, in a scaler 57 and the BDF, calculated in equation (5) or (6), is assigned a weight, $W_{10}$, in a selective scaler 58. Scaler 58 may select either BDFS or BDFP from unit 53. The weighted values of DFF and BDF are summed in an arithmetical unit 59 and the weighted sum is shown in a display 60.

The LEF is the formulaic sum of the DFF and the BDF as follows:

$$LEF=[W_9 \times DFF + W_{10} \times BDF] \quad (7)$$

Where:
- $W_9$=A weighting factor that apportions the contribution, and importance, of the DFF that may reduce expected life against the actual measure of bearing condition. A typical value might be in the range of 10 to 30%.
- $W_{10}$=A weighting factor that balances the actual state of bearing degradation and need for possible prompt replacement action against the need for preventive life extending action. A typical value might be in the range of 70 to 90%.

The sum of $W_9$ and $W_{10}$ is always 1.0 or 100%. For most cases, at present time, the ratio of $W_9$=15% is preferred and is the default value for $W_9$.

Note that the value of LEF may be such that a value of 100% is optimum, and consistent with optimum displayed values of DFF and BDF. If DFF dropped to dangerously low levels, but the bearing had not begun to degrade, the LEF reading would decline modestly to perhaps 80%. A quick look at DFF and BDF would confirm that the cause was related to required balancing or alignment but no harm has yet been done to the bearing.

The LEF combines, in a formulaic manner, the DFF and BDF to provide a technically based assessment of the machine condition. When LEF is high (80 to 100%) the machine or facility is in optimum condition. When LEF drops to readings between 40 and 80% the next level DFF and BDF factors should be viewed.

The DFF and BDF provide "stand alone" reports on the status of those factors that contribute to shortened machine life and bearing operating condition state, respectively. The former provides guidance on inspection and maintenance action required for balancing or alignment or other such life affecting factors, and the latter, if heeded, provides highly reliable indicators of action required on bearing replacement. Mean, or distributive displays of this factor, may be used to informatively display the condition of a machine. Reference is now made to Table II, set forth below:

TABLE II

| LEF | DFF | BDF | MEANING | ACTION REQUIRED | FAILURE PROBABILITY |
|---|---|---|---|---|---|
| >80% | >80% | >80% | Equipment Optimum | None | Low |
| <80% | <80% | >80% | Minor Imbalance | Inspect | Slight Increase |
| <60% | <60% | >80% | Requires Balance/Align | Work Order | Slight Increase |
| <80% | >80% | <60% | Bearing Lubrication | Lubrication | Moderate/Degrading |
| <40% | <40% | <40% | Bearing Near Failure | Replace Bearing | High |

Table II illustrates five different sample tests of the bearings on driven rotating machines utilizing the invention. In the first test, the LEF is above 80% indicating that both DFF and BDF are in an optimum range. No maintenance or service is required.

In the second test, a reading of less than 80% for LEF is observed. The practitioner then observes BDF and DFF and finds that DFF is less than the optimum range, that is <80%, while BDF is greater than 80%. In the case of a belt driven machine (assumed here for purposes of disclosure), this may indicate a minor imbalance or misalignment in the rotating drive. The practitioner will prepare a work order to inspect the drive and make whatever adjustment is necessary.

In the third test the LEF is found to be <60%, the DFF to be in the alert range of <60% while BDF is still in the optimum range of >80%. The low LEF indicates that immediate balance or alignment is necessary and a work order for repair will be prepared. In this case the BDF is still in the optimum range 80%, but the higher dynamic forces on the bearing indicate immediate attention to protect the LEF.

In the fourth test, the LEF is again low, upon further reference it is found that DFF is in the optimum range, >80%, but the BDF is low indicating that the bearing is degrading. The initial action will be to lubricate the bearing and recheck this machine at more frequent intervals.

In the fifth test it is found that the LEF is very low, <40%, indicating that both DFF and BDF are low. It is noted that OFF is less than 40% and BDF is less than 40%. This indicates that the bearing is in a condition having a high probability of failure and the dynamic forces on the bearing are contributing to bearing degradation. The machine will be taken out of service for bearing replacement and upon bearing replacement the drive for the machine will be balanced, realigned and otherwise serviced to minimize the dynamic forces and optimize life expectancy on the new bearing.

The indicia for determining OFF and BDF have been shown on a scale 0 to 100%. However, any other acceptable indicia for indicating these conditions may be utilized. A scale of 1 to 10 where the optimum condition is 0 to 2 may be utilized. In such case arithmetic unit 53 would not be programmed to subtract the discriminants from one hundred as shown in equation (5).

Also as an illuminated bar graph that displayed a scale of 0 to 10 or 0 to 100%, where 100% represents optimum condition may be used for OFF, BDF and LEF. A simple color-coded bar graph with green, yellow and red to indicate Optimum, Reduced, or Action status may be utilized to indicate each of the factors.

FIGS. 5a through 5e illustrate sample touch screen displays of a possible handheld PC implementation of the instrument.

A user of the invention may utilize the LEF to determine the decline in expected bearing life and to predict the probability of a bearing failure. The optimum expected life of a bearing under given operating conditions is usually available from the bearing manufacturer or may be calculated from equation (3). The probability of failure, F(T), for a selected time period may be determined by the Weibull probability equation:

$$F(T)=[1-e-(t/\theta)k] \quad (8)$$

Where
t=the time evaluation period over which the probability of failure is to be estimated
θ=the estimated mean time between failure $L_{50}$=LEF when new
Example: 100% LEF=50,000 hours=MTBF
K=2, generally used by bearing manufacturers
The reliability R(T) of a bearing may be determined by the companion (Weibull Survival) equation $$R(T)=e-(t/\theta)k \quad (9)$$

where the terms have the same meaning as equation (8).
Assume that t=one year=8760 hours.
Then the probability of failure, at the time of installation, in the first year of operation is $$F(T)=1-e^{-(8760/50000)^2}=0.03 \text{ or } 3\% \text{ and } R(T)=97\% \quad (10)$$

Assume that after one year of operation, LEF has dropped to 50% indicating that the manufacturer's expected life has been reduced to 50% of optimum or 25000 hours, and the probability of failure is sought within the next six months, then $$F=1-e^{-(4380/25000)^2}=0.03 \text{ or still } 3\% \text{ and } R(T)=97\% \quad (11)$$

If the probability of failure after one year of operation and in the next year of operation is sought and there has been a decrease in LEF of 50%, then $$F(T)=1-e^{-(8760/2500)^2}=0.115 \text{ or } 11.5\% \text{ and } R(T)=88.5\% \quad (12)$$

As hereinafter explained, the practitioner or user need only enter the information on the bearing manufacturer's optimum life expectancy and the time period under consideration into a system embodying the invention for the monitored machine. The processor of FIG. 4 performs the calculation of equations (8) or (9) and will display the F(T) or R(T) on a display screen.

Figure 4:
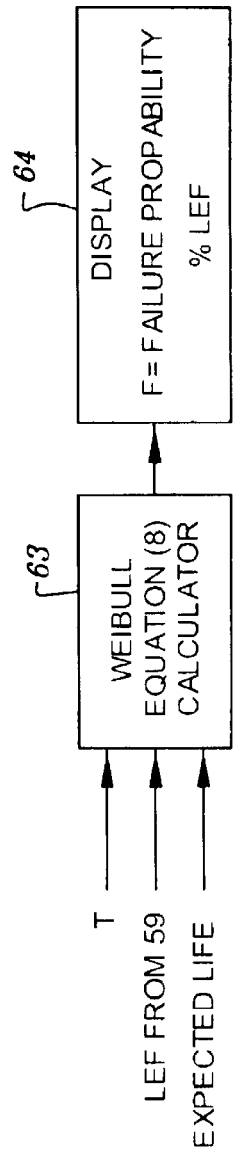
FIG. 4 is a schematic diagram in functional block form of a signal processor utilized in the invention.

A system embodying the invention includes a Weibull equation calculator 63 for solving equation (8). Referring to FIG. 4, calculator 63 receives a practitioner entered input indicated as t, the LEF from unit 59, FIG. 3, and will show on display 64 the probability of failure F or reliability R. Calculator 63 will also display the remaining expected life LEF of the bearing under test if the practitioner inputs the expected life of the bearing into processor 63.

A system embodying the invention may be embodied in a hand held multiple discriminant detector, analyzing and processing unit, referred to hereinafter as a processor, using a touch screen for display and entry of commands as will hereinafter be described.

The system 10 will initially be constructed with certain coefficients preset in view of the specifications of the accelerometer and the number of discriminants to be derived for determining BDF. In the example set forth herein the scalers 21, 25, 35, 41 and 49 will be manufacturer preset for the accelerometer as exemplified in Table I for the coefficients $W_3$–$W_5$ The coefficient $W_6$ is set at the preferred or default value of 0.20 but the practitioner may vary this from zero (0) to one (1.0). $W_9$ is set at a default value of 0.15 but the practitioner may vary this within the range previously stated. $W_{10}$ is 1.00–$W_9$.

Figure 5A:
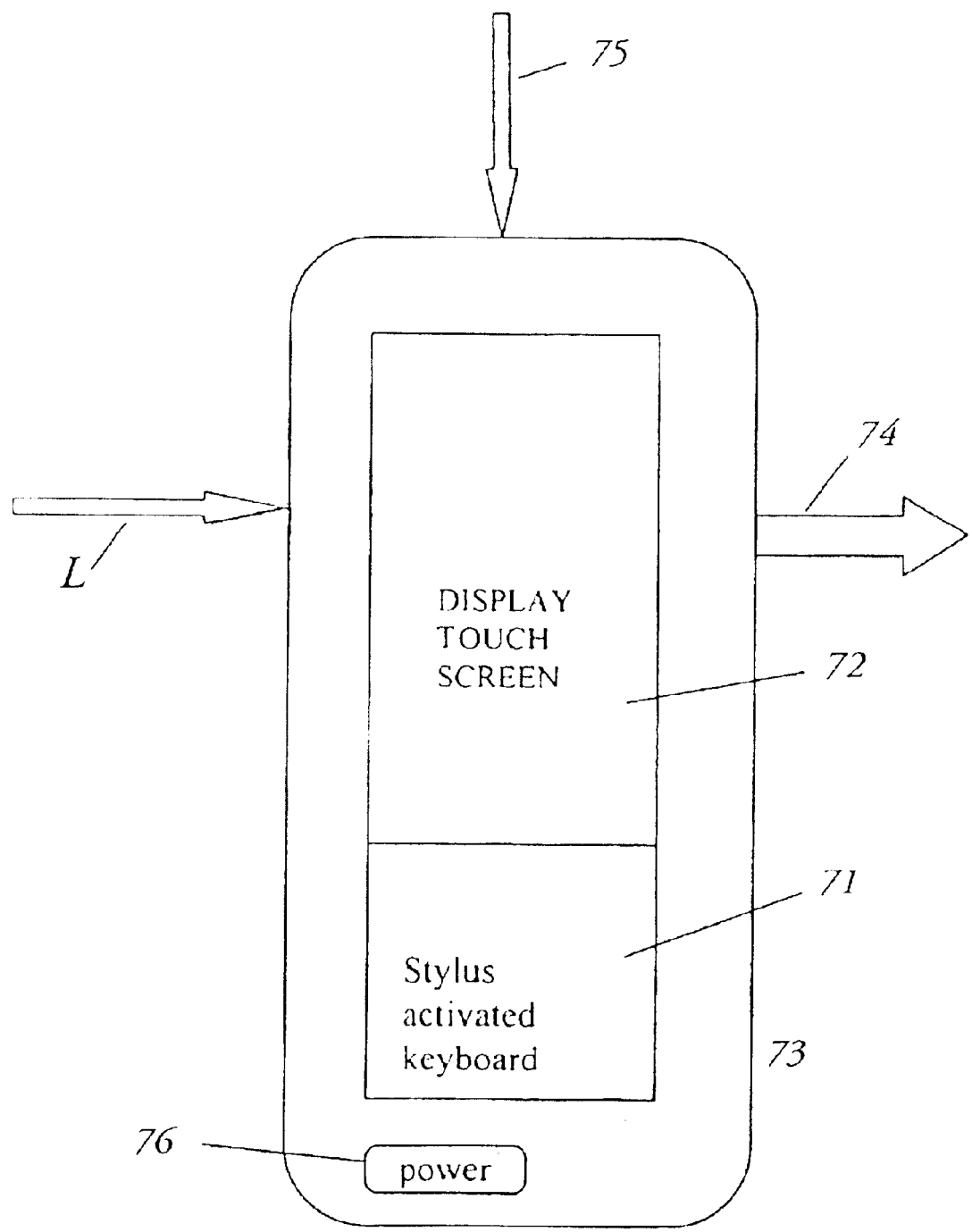

A multiple discriminant detector and analyzer 70 (hereinafter "processor") which includes all of the circuitry shown in FIGS. 14 in a casing or housing 71 is shown in FIG. 5a and the touch screen 72 thereof in various modes in FIGS. 5b–5d. The processor 70 is similar in size to a hand held computer and has many features in common therewith. The analyzer is battery operated and receives inputs from accelerometer 11 over a cable L as shown in FIGS. 1 and 2. The processor will also supply operating power to accelerometer 11. The processor 70, as shown in FIG. 5a, includes a conventional touch screen 72 and a computer-like stylus activated keyboard 73 for data input. Analyzer 70 includes an output port represented by the arrow 74 and an input port represented by arrow 75 to receive input from a bar code reader which reads point identification on machines to be tested. When a power button 76 is initially touched, the system is powered-up and the touch screen shown in FIG. 5b appears.

Processor 70 includes a memory 102 which stores all discriminants and factors as shown, which are readily available for read-out upon command.

Figure 5B:
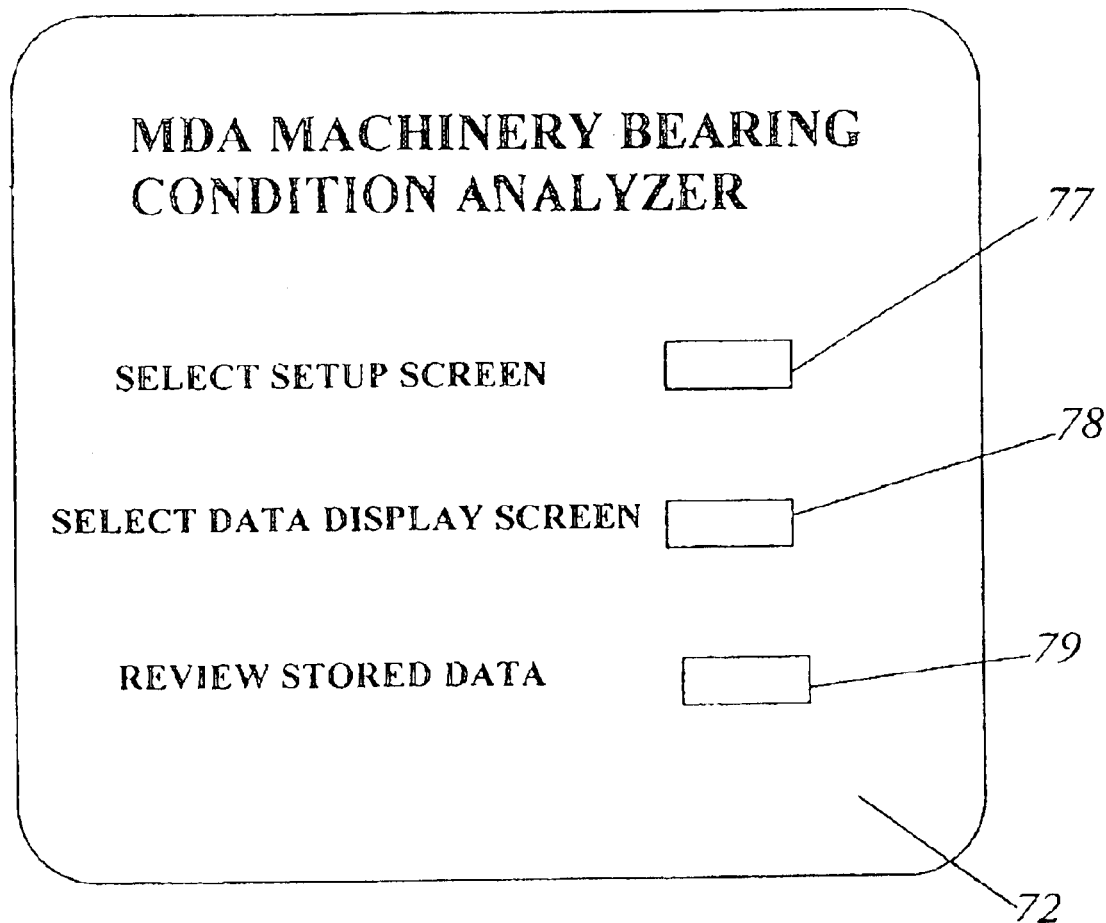

As shown in FIG. 5b, three modes of operation are offered, Set-Up, Data Display and Review Stored Data on screen 72 together with selection indicia 77, 78 and 79, respectively. The Set-Up mode is first discussed. It will be assumed that the user will want to initially set system parameters different than previous settings. Upon selection of Set-UP the screen 72 displays a set-up menu as shown in FIG. 5c.

The user may enter the date on indicia 81 by means of the stylus-activated keyboard 73. The user will then touch POINT ID, indicia 82 to read the bar code or other identifying indicia on the machine to be tested. If the machine to be inspected is not identified by a bar code, the user may enter identifying nomenclature on the keyboard 73.

Other selection indicia are FLEXIBLE 83 for a flexibly mounted machine, RIGID 84 for a rigidly mounted machine, RPM 85 to set the upper limit of filter 19, $W_6$ 86 to set the percentage of HFD to be included in DFF, $W_9$ 87 to determine the percentage of DFF in LEF, $W_{10}$ 89 to enter the BDF for LEF, EXPECTED LIFE 90 to enter the remaining expected life of the bearing under investigation, and TIME PERIOD 91 to enter the time period for which the probability failure or reliability is sought. The indicia 84, 85, 86, 87, 89 and 90 include drop down arrows for the user to select parameters if the user does want to set-up the default values.

Under the heading DISPLAY 91, the user will select ON or OFF for the data that is to be displayed. Then, the user will touch SAVE SET-UP 92 and then NXT to advance to the display screen shown in FIG. 5d. The DISCRIMINANT selections on the set up screen are hereinafter discussed.

Figure 5D:
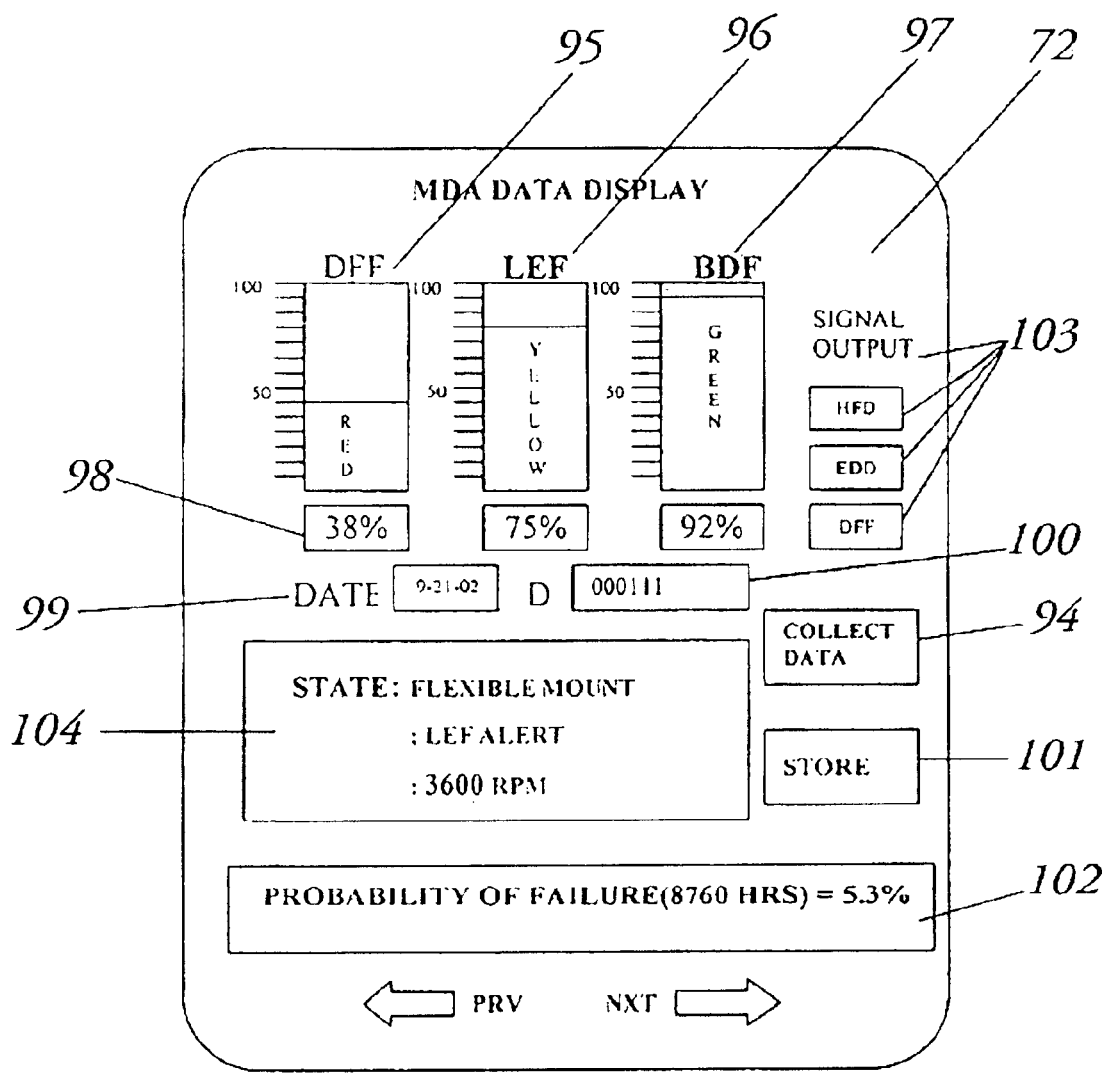

The user will initially select COLLECT DATA 94 on the display screen of FIG. 5d to commence detecting the data from accelerometer 11. When the accelerometer signal $V_a$ is analyzed the various derived factors, DFF, LEF and BDF are shown as displays in colored bar graphs 95, 96 and 97 and the percentage DFF, LEF and BDF in windows 98, 99 and 100, both respectively.

For the particular machine being inspected it is noted that BDF is in the optimum range, LEF is just below optimum and DFF is indicating unacceptable dynamic loading. This notifies the user that steps should immediately be taken to correct the unacceptable dynamic loading on the bearing.

Figure 5E:
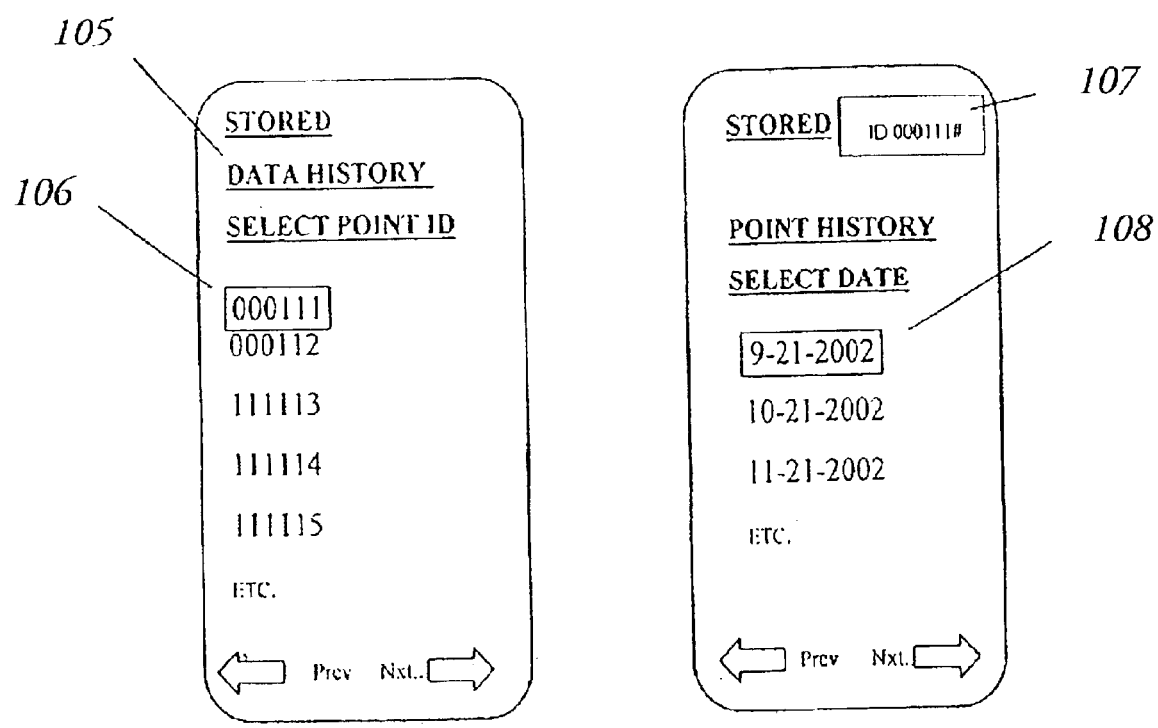

After the user has made observation of the display screen he or she may touch STORE 101 to forward the collected data to the processor memory 102 shown in FIG. 6. Memory 102 will store data from all previous tests on all bearings by machine identification and date as shown in FIG. 6, which may be called up to review the history of previous inspections as shown in FIGS. 5e and 5f and determine any trends in bearing condition or dynamic loading.

While the invention has been disclosed as being implemented by analog techniques, as embodied in prototype form, for purposes of disclosure, the invention may be practiced using all digital technology receiving the acceleration signal $V_a$ or by any combination of analog and digital technology.

The invention provides a new, improved and simplified technique of determining and indicating the present condition of rolling element bearings and the life expectancy thereof. The bearing data is determined by known and effective techniques which normally require sophisticated equipment and highly skilled practitioners but is communicated in a highly informative but simplified manner for observation and use by other than highly skilled personnel. The bearings of rotating machines may be periodically inspected and the results stored for later reference to determine if there is any LEF or BDF trends for particular machines or particular types or models of machines.

It may thus be seen that the objects of the invention set forth above, as well as those made apparent are efficiently attained. While preferred embodiments of the invention have been set forth for purposes of disclosure other embodiments of the invention may occur to those skilled in the art. Accordingly the appended claims are intended to cover all embodiments of the invention and modifications thereto which do not depart from the spirit and scope of the invention.

What is claimed is:

1. A method of monitoring and analyzing vibrations in a rotating machine having rolling element bearings to determine machine bearing condition comprising the steps of
   a. providing an accelerometer to detect an acceleration signal indicative of machine vibration;
   b. determining the RMS value of said acceleration signal to provide a first signal;
   c. filtering the acceleration signal for signal frequencies indicative of bearing surface defects, and converting the RMS value of said signal frequencies to a second signal;
   d. determining the peak value of the acceleration signal, determining the ratio of said peak value to the RMS value of the first acceleration signal and converting said ratio to a third signal;
   e. determining the square of the peak value of the acceleration signal, determining the ratio of said squared peak value to said first signal and converting said ratio to a fourth signal;
   f. detecting a signal at the resonant frequency of the accelerometer, demodulating said resonant frequency signal and converting the low frequency component energy of the demodulated components to a fifth signal; and
   g. combining said second through fifth signals in predetermined weights to obtain a voltage value indicative of the condition of the bearings in the rotating machine.

2. The method of claim 1 wherein the combing of said four signals is by multiplication.

3. The method of claim 1 wherein the combining of said four signals is by addition.

4. A method of monitoring and analyzing vibrations in a rotating machine having rolling element bearings to determine machine bearing condition comprising the steps of
   a. providing an accelerometer to detect an acceleration signal indicative of machine vibration;
   b. filtering the vibration signal for signal frequencies indicative of bearing surface defects and converting the RMS value of said signal frequencies to a first voltage signal;
   c. determining the RMS value of the acceleration signal;
   d. determining the peak value of the acceleration signal, determining the ratio of said peak value to the RMS value of the acceleration signal and converting said ratio to a second voltage signal;
   e. determining the square of the peak value of the acceleration signal, determining the ratio of said squared peak value and converting said ratio to a DC voltage;
   f. detecting a signal at the resonant frequency of the accelerometer, demodulating said signal at the resonant frequency and converting its low frequency energy to a third DC voltage signal; and
   g. combining said first voltage signal and at least two of said second, third and forth voltage signals in predetermined weights to obtain a voltage value indicative of the condition of the bearings in the rotating machine.

5. The method of claim 4 further including the further step of filtering the accelerometer signal for low frequencies below about four times the rotational speed of the machine, which are indicative of dynamic forces on the machine bearings to provide a dynamic forces factor signal and combining the dynamic forces factor signal with the bearing degradation signal in a weighted relationship to obtain a life expectancy signal indicative of the expected remaining life of the bearing under test.

6. The method of claim 5 comprising the further step modifying the dynamic forces factor signal a factor indicative of the rigid or flexible mounting method of the machine.

7. A method of monitoring and analyzing vibrations in a rotating machine having rolling element bearings to determine the dynamic forces acting on the bearings comprising the steps of
   a. providing an accelerometer to detect an acceleration signal indicative of machine vibration;
   b. filtering the accelerometer signal for low frequencies below about four times the rotational speed of the machine, which are indicative of dynamic forces on the machine bearings, converting said low frequencies to a first voltage signal; and
   c. filtering the acceleration signal for the high frequency impact energy signal frequencies indicative of bearing surface defects and converting the RMS value of said signal frequencies to a second voltage signal; and combining a portion of said second voltage signal indicative of Hertzian fatigue with said first voltage signal to derive a third voltage signal indicative of the dynamic forces on the bearings.

8. The method of claim 7 further comprising filtering the acceleration signal for the high frequency impact energy signal frequencies indicative of bearing defects by representing a plurality of discriminants as separate voltage signals, said discriminants indicative of dynamic forces on the bearings.

9. A system for monitoring and analyzing vibrations in a rotating machine having rolling element bearings to determine machine bearing condition comprising a. an accelerometer mountable to the machine to sense vibrations and provide an acceleration signal indicative of machine vibration;

b. first means receiving the acceleration signal determining the RMS value of said acceleration signal and providing a first signal indicative thereof;

c. a first filtering means for filtering the acceleration signal for signal frequencies indicative of bearing surface defects and converting the RMS value of said signal frequencies to a second signal, d. first means for determining the peak value of the acceleration signal and determining the ratio of said peak value to the first signal and converting said ratio to a third signal;

e. second means for determining the square of the peak value of the acceleration signal, determining the ratio of said squared peak value to said first signal and converting said ratio to a fourth signal;

f. detecting from the acceleration signal a signal at the resonant frequency of the accelerometer, demodulating the signal at the resonant frequency, and converting the demodulated signal to a fifth signal; and g. means for combining said second through fifth signals to obtain a signal indicative of the condition of the bearings in the rotating machine.

10. The system of claim 9 where each of said second through fifth signals are derived in a channel receiving the acceleration signal and each of said channels includes scaling means for making each of said second through fifth signals of equal value for a predetermined condition of a bearing under inspection.

11. The system of claim 10 wherein said means for combining is an arithmetic unit which sums the second through fifth signals, multiplies the sum by the reciprocal of the number of channels and subtracts the resultant product from a reference value to obtain a value indicative of the existing condition of degradation of the bearing.

12. The system of claim 10 wherein said means for combining is an arithmetic unit which multiplies the values of the second through fifth signals and further multiplies the product by $1/10^{-n}$ where n is the number of channels.

* * * * *

UNITED STATES PATENT AND TRADEMARK OFFICE
CERTIFICATE OF CORRECTION

PATENT NO. : 6,763,312 B1
DATED : July 13, 2004
INVENTOR(S) : Judd

It is certified that error appears in the above-identified patent and that said Letters Patent is hereby corrected as shown below:

Column 11,
Line 52, delete "50, EDD" and substitute therefor -- 60, EDD --

Column 14,
Line 41, delete "OFF" and substitute therefor -- DFF --
Line 50, delete "OFF" and substitute therefor -- DFF --

Column 16,
Line 7, delete "Figs. 14" and substitute therefor -- Figs. 1-4 --

Signed and Sealed this

First Day of February, 2005

JON W. DUDAS
*Director of the United States Patent and Trademark Office*